UNITED STATES PATENT OFFICE.

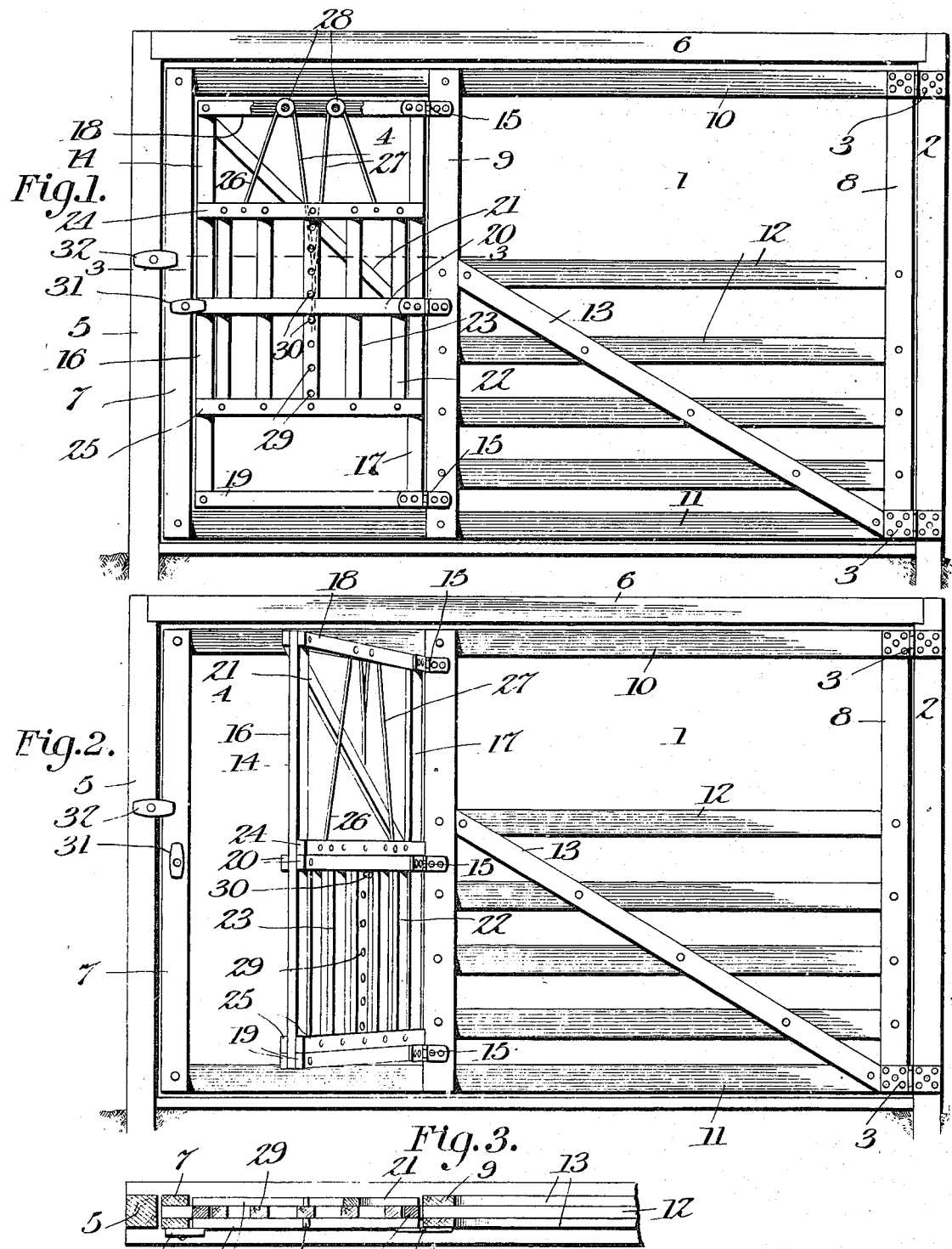

JOSEPH R. CARR, OF CLEVELAND, OKLAHOMA.

GATE.

1,132,438.

Specification of Letters Patent. Patented Mar. 16, 1915.

Application filed June 13, 1914. Serial No. 844,978.

*To all whom it may concern:*

Be it known that I, JOSEPH R. CARR, a citizen of the United States, residing at Cleveland, in the county of Pawnee and State of Oklahoma, have invented a new and useful Gate, of which the following is a specification.

The invention relates to improvements in gates.

The object of the present invention is to improve the construction of gates and to provide a simple, practical, and efficient gate, adapted to be easily and cheaply made, and designed for use on farms, stock yards, and various other places where it is sometimes necessary to separate small animals from the larger ones, and where gates of different sizes are desirable or advantageous.

A further object of the invention is to provide a swinging gate designed to be constructed of a size to permit the passage of teams and the like, and equipped with a supplemental swinging single gate adapted to be used by persons and for the passage of a horse or cattle singly, and having a vertically slidable gate adapted to be opened to permit the passage of small animals without allowing the larger ones to pass through.

With these and other objects in view the invention consists in the construction and novel combination of parts hereinafter fully described, illustrated in the accompanying drawing, and pointed out in the claims hereto appended, it being understood that various changes in the form, proportion, size and minor details of construction, within the scope of the claims, may be resorted to without departing from the spirit or sacrificing any of the advantages of the invention.

In the drawing:—Figure 1 is an elevation of a swinging gate constructed in accordance with this invention, the slidable gate being shown in an elevated position. Fig. 2 is a similar view, the supplemental swinging gate being open and the sliding gate being closed. Fig. 3 is a horizontal sectional view on the line 3—3 of Fig. 1.

Like numerals of reference designate corresponding parts in all the figures of the drawing.

In the accompanying drawing, in which is illustrated the preferred embodiment of the invention, 1 designates a main swinging gate hinged to a suitable post or upright 2 by upper and lower hinges 3 and provided at its front with a vertical opening 4 constituting a passage way or gate way and designed for the use of persons and also adapted to permit a horse or other stock to pass through singly.

In the accompanying drawing, the rear hinged post or upright constitutes a portion of a support and is connected with a front post or upright 5 by a top beam 6, but the swinging main gate may be mounted in any other desired manner and a bottom sill may or may not be employed. The main swinging gate consists of end and intermediate vertical bars 7, 8, and 9, arranged in pairs and connected by horizontal top and bottom bars 10 and 11, the intermediate vertical bars being spaced from the front vertical bars to form the said gate way 4. The major portion of the space between the intermediate vertical bars and the rear vertical end bars is closed by horizontal rails 12. The main gate is also braced by inclined bars or braces 13, extending from the lower ends of the rear bars 8 to the intermediate bars 9 at a point between the ends thereof. The main gate, in which a supplemental swinging gate 14 is framed, may be constructed in any other suitable manner.

The supplemental gate, which is connected by hinges 15 to one of the intermediate vertical bars 9, is arranged between the intermediate vertical bars 9 and the front end bars 8 when in its closed position, and it is adapted to swing outwardly to expose the passage way or gate way 4, as clearly illustrated in Fig. 2 of the drawing. The supplemental swinging gate is composed of front and rear vertical bars 16 and 17, and top, bottom, and central connecting bars 18, 19, and 20, arranged in pairs and secured at their terminals to the opposite faces of the vertical bars 16 and 17. The supplemental gate is also braced by an inclined diagonally arranged bar 21, extending from the rear end of one of the central bars 20 to the front end of one of the top bars 18. The front and rear bars 16 and 17 form guides for a vertically slidable gate 22, composed of vertical bars 23 extending between the central bars 20 and connected at their terminals by upper and lower bars 24 and 25. The vertical bars 23 are of a length to extend from the lower bars 25 to a point slightly above the central bars 20, so that the top bar 24 is arranged upon one of the central bars 20, and the bottom bars 25 are arranged upon the lower bars 19 when the sliding gate is closed. A single top bar 24 is employed, as the central bars slidably connect the upper portion of the gate 22 with the supplemental gate 14. A pair of lower bars is employed, and the terminals thereof slidably embrace the front and rear bars 16 and 17 of the supplemental swinging gate.

The sliding gate, which is adapted to close automatically by gravity, is opened by an operating cord or rope 26 having branches 27 passing over pulleys 28, which are mounted between the top bars of the supplemental swinging gate. The central vertical bar of the sliding gate is provided at intervals with perforations 29, adapted to receive pins 30, designed to be arranged above and below the central bars 20 for securing the sliding gate in its adjustment. When the pins are arranged above and below the central bars, the sliding gate will be supported in an elevated position, and will be prevented from being lifted by animals passing under it. Also, when the gate is closed, one of the pins will be arranged beneath the central bars to prevent the sliding gate being opened. The main swinging gate is designed to be equipped with a suitable latch 31 for holding the supplemental gate in its closed position, and the main gate will be locked by a latch 32 mounted on the latch post 5. Any desired construction of latch may be employed for fastening the swinging gates.

The supplemental swinging gate is designed to be used for persons, and will afford a passage way for a single horse or any other stock. The slidable gate is designed for separating small animals from larger ones, without permitting the larger ones to pass through the gate way. The main gate, which carries the supplemental swinging gate and the sliding gate, is adapted to be used when the full gate way is required.

What is claimed is:

1. The combination of a main swinging gate including front and rear vertical bars, an intermediate vertical bar spaced from the front vertical bar to form a passage way, top and bottom bars connecting the said vertical bars, means located at the rear vertical bar for hinging the main swinging gate, a supplemental swinging gate hinged to the intermediate vertical bar of the main gate and closing the passage way thereof, said supplemental gate having spaced vertical bars, fastening means for securing the supplemental gate to the front vertical bar of the main gate to hold the supplemental gate in its closed position, a vertically sliding gate carried by the supplemental swinging gate and guided by the vertical bars thereof and constituting the lower portion of the said supplemental gate, and means for raising and lowering the sliding gate.

2. The combination of a main swinging gate provided with spaced vertical bars and having an intervening gate way or passage between the same, a supplemental swinging gate having a frame including spaced vertical bars and a pair of spaced horizontal connecting bars located at a point intermediate of the top and bottom of the supplemental gate, a vertically movable gate composed of vertical bars and top and bottom connecting bars, the vertical bars extending through the said horizontal bars of the supplemental gate, and the bottom bars of the vertically movable gate slidably embracing the vertical bars of the supplemental gate, and means carried by the slidable gate for engaging the horizontal bars of the supplemental gate for securing the said sliding gate in its closed position and also in its adjustment.

In testimony, that I claim the foregoing as my own, I have hereto affixed my signature in the presence of two witnesses.

JOSEPH R. CARR.

Witnesses:
T. M. HAYS,
O. E. WHALEN.